July 8, 1924.

C. G. OVERMYER

GLASS CASTER

Filed July 9, 1923

1,500,199

C. G. Overmyer, Inventor

By C. A. Snow & Co.

Attorneys

Patented July 8, 1924.

1,500,199

UNITED STATES PATENT OFFICE.

CHARLES G. OVERMYER, OF HARTFORD CITY, INDIANA.

GLASS CASTER.

Application filed July 9, 1923. Serial No. 650,411.

*To all whom it may concern:*

Be it known that I, CHARLES G. OVERMYER, a citizen of the United States, residing at Hartford City, in the county of Blackford and State of Indiana, have invented a new and useful Glass Caster, of which the following is a specification.

This invention relates to furniture casters of the sliding or gliding type for use in connection with furniture having hollow legs.

The object of the invention is to provide a gliding glass caster which is so constructed that it will be simple and inexpensive to manufacture and which is equipped with simple and efficient means for attaching it to a hollow leg.

Another object is to provide a simple inexpensive attachment for connecting the glass caster to a hollow leg, said attachment having strong reliable fingers for detachably connecting the attachment to the caster and the caster to the leg.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1:
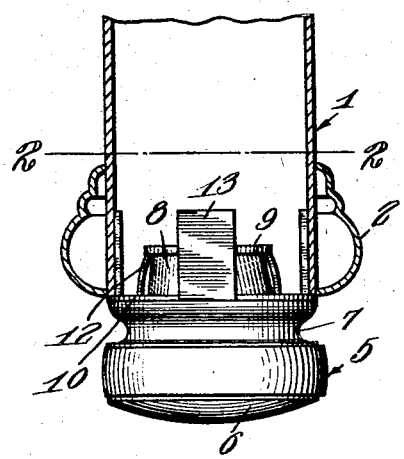
Figure 1 represents a side elevation of a caster constructed in accordance with this invention shown applied, the leg to which it is applied being shown in section.
Figure 3:
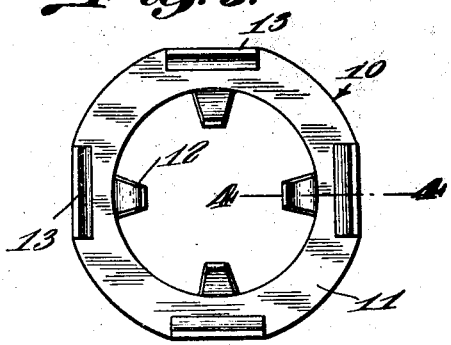
Fig. 3 is a plan view of the attachment detached.
Figure 2:
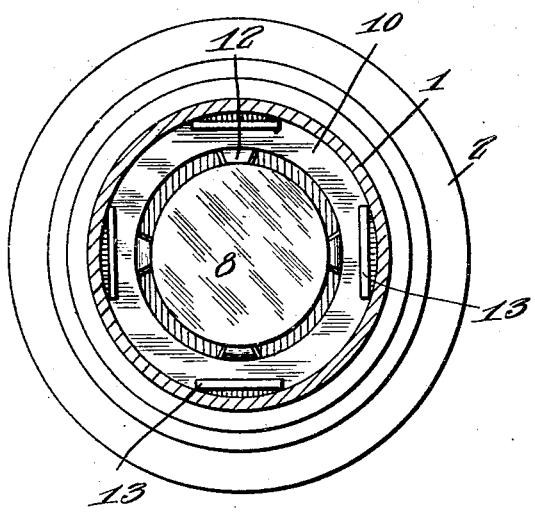
Fig. 2 is a horizontal section taken on the line 2—2 of Fig. 1.

In the embodiment illustrated a hollow leg 1 is shown such as is used on metal beds and which has the usual hollow ornamental bead 2 at its lower end on its outer face.

The caster 5 to be used in connection with such a leg is preferably constructed of glass being of knob-like construction with a convex surface engaging face 6 and having a peripherally grooved shank 7. A reduced centrally disposed stem 8 is carried by the inner end of the caster and is provided with an annular laterally extending flange 9 which is of a diameter corresponding to the base of the stem and which forms a shoulder for the abutment of the attaching device presently to be described. This stem 8 is inclined upwardly from its base to the base of the flange 9.

An attaching device 10 for connecting the caster 5 with the leg 1 is shown in the form of an annular plate 11 having a plurality of short perpendicular fingers 12 carried by its inner edge which are of a length corresponding to the distance between the base of stem 8 and the shoulder formed by the under face of the flange 9 so that when the attachment is applied these fingers will lock under said flange and connect the attachment to the caster.

Figure 4:
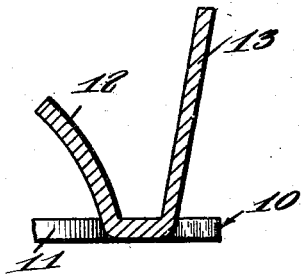
Fig. 4 is a detail sectional view taken on the line 4—4 of Fig. 3.

A plurality of perpendicular fingers 13 are carried by the outer edge of the plate 11 being here shown arranged opposite the fingers 12. These fingers 13 have their bases located at points spaced inwardly from the perimeter of plate 11 and are inclined outwardly from their bases upward as shown clearly in Fig. 4 so that when they are compressed and inserted in the leg 1 they will grip the inner face thereof and securely connect the caster to the leg.

The fingers 12 are shown tapered toward their free ends and being short will effectively hold the attachment 10 engaged with the caster 5.

The top of the caster including the flange 9 is of the same diameter as the base of stem 8, said stem having a gradual taper from its base to said flange which is necessary in order that the attachment may fit snugly on the caster around the stem when in operative position the opening in the plate being sufficiently large to permit it to pass downward over the flanged top of the caster and yet fit snugly on the base of its stem.

When the attachment 10 is applied to the caster by slipping the plate 11 down over the stem with the free ends of the fingers 12 engaged under the flange 9 the caster is ready for connection with the leg and this is accomplished by compressing the fingers 13 and inserting them inside the leg with the end of the leg resting on the plate 11 outside the fingers which operates to protect the caster. The fingers 13 when inserted, being more or less resilient, spring out against the inner face of the leg 1 and clampingly connect the caster to the leg.

From the above description it will be obvious that a caster constructed as herein shown and described and equipped with the attaching element 10 may be quickly and easily applied to or removed from a hollow furniture leg 1 and should either the attachment or caster be broken or injured the attachment being readily removed from the caster a new one may be substituted.

Various changes in the form, shape, proportion, and other minor details of construction may be made without departing from the principle or sacrificing any of the advantages of the claimed invention.

I claim:—

1. In a device of the class described comprising a caster having a body and a stem, a retainer including an annular plate supported on the body and having perpendicular fingers on its inner and outer perimeters, said stem having means for engagement by one set of fingers to connect the retainer to the caster; the other set of fingers being adapted to engage the leg in connection with which the caster is to be used.

2. In a device of the class described, a caster comprising a body and a stem, said stem having an annular flange at its outer end, an attachment for connecting a caster to a hollow leg including a plate supported on said body and having fingers to receive said stem and engage under said flange, said attachment also having other fingers to enter and hold the retainer and caster in a hollow furniture leg.

3. In a device of the class described, a caster comprising a body and a stem; and a retainer or connecting element in the form of an annular plate to incircle said stem and rest on said body, said plate having perpendicular fingers on its inner and outer perimeter, said fingers being disposed opposite each other, said stem having laterally extending fingers on its outer end under which fingers on the inner perimeter are designed to engage, the outer fingers being adapted to enter a hollow furniture leg and engage the inner walls thereof.

In testimony that I claim the foregoing as my own, I have hereto affixed my signature in the presence of two witnesses.

CHARLES G. OVERMYER.

Witnesses:
C. H. OVERMYER,
J. M. BONHAM.